US012248157B2

(12) United States Patent
Wang et al.

(10) Patent No.: US 12,248,157 B2
(45) Date of Patent: Mar. 11, 2025

(54) PROJECTION SCREEN

(71) Applicant: APPOTRONICS CORPORATION LIMITED, Guangdong (CN)

(72) Inventors: Lin Wang, Guangdong (CN); Xiaofeng Tang, Guangdong (CN); Wei Sun, Guangdong (CN); Yi Li, Guangdong (CN)

(73) Assignee: APPOTRONICS CORPORATION LIMITED, Guangdong (CN)

( * ) Notice: Subject to any disclaimer, the term of this patent is extended or adjusted under 35 U.S.C. 154(b) by 583 days.

(21) Appl. No.: 17/597,394

(22) PCT Filed: Jun. 28, 2020

(86) PCT No.: PCT/CN2020/098459
§ 371 (c)(1),
(2) Date: Jan. 4, 2022

(87) PCT Pub. No.: WO2021/004301
PCT Pub. Date: Jan. 14, 2021

(65) Prior Publication Data
US 2022/0268975 A1    Aug. 25, 2022

(30) Foreign Application Priority Data
Jul. 5, 2019 (CN) .......................... 201910605044.X

(51) Int. Cl.
*G02B 5/02* (2006.01)
*G02B 27/01* (2006.01)

(52) U.S. Cl.
CPC ......... *G02B 5/0242* (2013.01); *G02B 5/0284* (2013.01); *G02B 27/0101* (2013.01); *G02B 2027/0118* (2013.01)

(58) Field of Classification Search
CPC .. G02B 5/0242; G02B 5/0284; G02B 5/0289; G02B 5/04; G02B 5/045; G02B 5/12;
(Continued)

(56) References Cited

U.S. PATENT DOCUMENTS

| 5,055,737 | A | 10/1991 | Murata et al. | |
| 11,892,766 | B2 * | 2/2024 | Wang | G03B 21/62 |
| 2007/0081245 | A1 | 4/2007 | Smith | |
| 2008/0030882 | A1 | 2/2008 | Ichikawa et al. | |

(Continued)

FOREIGN PATENT DOCUMENTS

| CN | 1217065 A | 5/1999 |
| CN | 103809357 A | 5/2014 |

(Continued)

OTHER PUBLICATIONS

European Patent Office, Extended European Search Report Issued in Application No. 20837848.9, Oct. 4, 2022, Germany, 9 pages.
(Continued)

*Primary Examiner* — Sultan Chowdhury
(74) *Attorney, Agent, or Firm* — McCoy Russell LLP

(57) ABSTRACT

A projection screen, with a design in which the apexes of multiple triangular pyramidal units of the projection screen in an array arrangement change gradually according to a predetermined relation, an image light shone from a projector is reflected by a microstructure layer having the triangular pyramidal units and then converged in a range centered around the human eyes, so as to reduce the degree of difference in brightness at different viewing positions, thus ensuring that the projection screen is provided with excellent uniformity and high gain.

14 Claims, 9 Drawing Sheets

(58) Field of Classification Search
CPC .... G02B 5/124; G02B 27/00; G02B 27/0101; G02B 27/0172; G03B 21/56; G03B 21/60; G03B 21/562
See application file for complete search history.

(56) References Cited

U.S. PATENT DOCUMENTS

| | | | | |
|---|---|---|---|---|
| 2008/0090063 | A1* | 4/2008 | Inokuma | G02B 5/0268 428/220 |
| 2015/0029442 | A1* | 1/2015 | Koike | G02B 5/045 349/65 |
| 2017/0251203 | A1 | 8/2017 | Wang | |
| 2019/0294037 | A1* | 9/2019 | Chen | G02B 5/0294 |
| 2019/0346757 | A1* | 11/2019 | Su | G02B 6/0025 |

FOREIGN PATENT DOCUMENTS

| | | |
|---|---|---|
| CN | 106405699 A | 2/2017 |
| CN | 109031879 A | 12/2018 |
| CN | 109388013 A | 2/2019 |
| CN | 109634046 A | 4/2019 |
| JP | 2006145881 A | 6/2006 |
| RU | 2332696 C1 | 8/2008 |
| WO | 2018027071 A1 | 2/2018 |

OTHER PUBLICATIONS

State Intellectual Property Office of the People's Republic of China, Office Action and Search Report Issued in Application No. 201910605044.X, Oct. 19, 2022, 11 pages. (Submitted with Partial Translation).

ISA China National Intellectual Property Administration, International Search Report Issued in Application No. PCT/CN2020/098459, Sep. 29, 2020, WIPO, 6 pages.

European Patent Office, Extended European Search Report Issued in Application No. 20837848.9, Jun. 29, 2022, Germany, 11 pages.

\* cited by examiner

PROJECTION SCREEN

CROSS REFERENCE TO RELATED APPLICATIONS

The present application is a U.S. National Phase of International Application No. PCT/CN2020/098459 entitled "PROJECTION SCREEN," and filed on Jun. 28, 2020. International Application No. PCT/CN2020/098459 claims priority to Chinese Patent Application No. 201910605044.X filed on Jul. 5, 2019. The entire contents of each of the above-listed applications are hereby incorporated by reference for all purposes.

TECHNICAL FIELD

The present disclosure relates to the technical field of projection, and in particular, to a projection screen.

BACKGROUND AND SUMMARY

Projection display is increasingly used nowadays. The principle of the projection display is as follows: a projector projects image light onto a screen (known as a projection screen), the image light is reflected on the screen, and the reflected image light is received by human eyes. It seems to the human eyes as if the image light were emitted from the screen. In this way, an image is formed on the screen. Compared with the case where the projector projects image light directly onto a wall, the projection screen has a special surface microstructure design that directs the reflected image light to a viewer region. Therefore, the projection screen significantly improves the projection display effect.

Gain and uniformity are important design parameters for the projection screen. To ensure the viewing experience of the viewer, the projection screen needs to have both high gain and good brightness uniformity. The gain of the projection screen represents brightness levels in different viewing areas. Higher gain of the projection screen corresponds to better brightness experience. The uniformity is a measure of brightness differences at different viewing positions in a horizontal direction. Higher uniformity corresponds to better viewing experience.

The present disclosure provides a projection screen with good uniformity and high gain.

A projection screen according to an embodiment of the present disclosure includes a microstructure layer, the microstructure layer including a matrix layer and a microstructure unit formed on a surface of the matrix layer. The microstructure unit includes triangular pyramid units arranged in an array. At least two of the triangular pyramid units that are arranged in a same row are identical to each other, and at least two triangular pyramid units of the triangular pyramid units that are arranged in a same column respectively have vertex angles that vary gradually, and each of the vertex angles forms between the surface of the matrix layer and an edge of one of the triangular pyramid units that has the vertex angle.

The projection screen provided by the present disclosure includes multiple triangular pyramid units arranged in an array. Vertex angles of the triangular pyramid units vary gradually according to a predetermined relationship, so that image light transmitted from a projector is reflected by a microstructure layer having the triangular pyramid units and then converged in a range centered around human eyes, to reduce brightness differences at different viewing positions, thereby ensuring good uniformity and high gain of the projection screen.

DETAILED DESCRIPTION

The primary objective of the present disclosure is as follows: for a projection screen including multiple triangular pyramid units arranged in an array, vertex angles of the triangular pyramid units vary gradually in such a manner that image light transmitted from a projector is reflected by a microstructure layer having the triangular pyramid units and then converged in a range centered around human eyes, to reduce brightness differences at different viewing positions, thereby ensuring good brightness uniformity and high gain of the projection screen. In this way, both good brightness uniformity and high gain are achieved.

Based on the above objective, the following clearly and completely describes the technical solutions in the embodiments of the present disclosure with reference to the accompanying drawings in the embodiments of the present disclosure. It is understandable that the specific embodiments described herein are merely intended to explain the present disclosure, rather than to limit the present disclosure. The following embodiments and technical features in the embodiments can be combined with each other when there is no conflict therebetween. It should also be noted that, for convenience of description, only a partial structure related to the present disclosure rather than all the structure is shown in the accompany drawings. All other embodiments obtained by the person of ordinary skill in the art based on the embodiments of the present disclosure without creative efforts should fall within the protection scope of the present disclosure.

Figure 1:
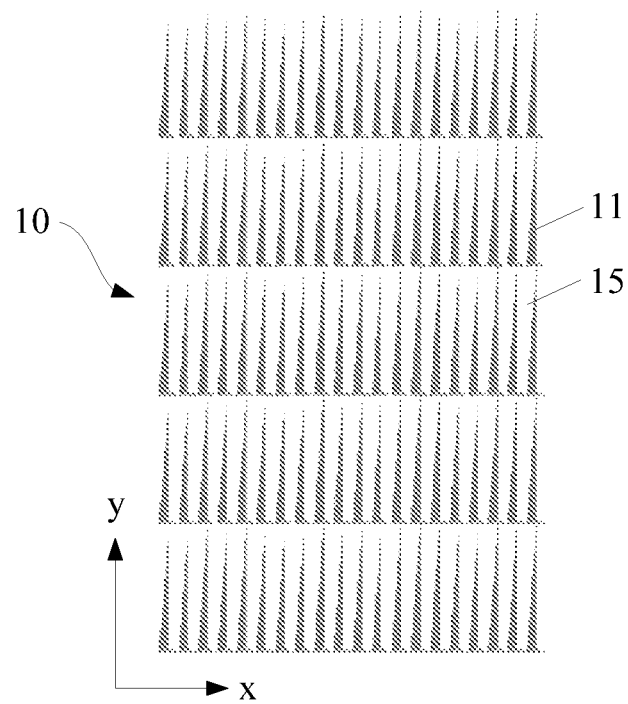
FIG. 1 is a top view of a partial structure of a microstructure layer of a projection screen according to a first embodiment of the present disclosure.
Figure 2:
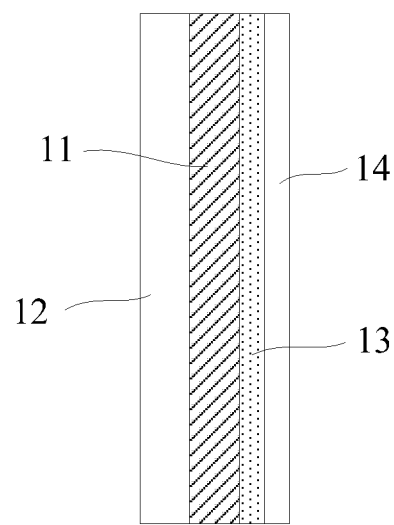
FIG. 2 is a cross-sectional view of the projection screen in FIG. 1 taken along direction A-A.

FIG. 1 is a top view of a partial structure of a microstructure layer of a projection screen according to a first embodiment of the present disclosure. FIG. 2 is a cross-sectional view of the projection screen in FIG. 1 taken along direction A-A. Referring to FIG. 1 and FIG. 2, the microstructure layer of the projection screen 10 includes a matrix layer 12 and a microstructure unit formed on a surface of the matrix layer 12, and the microstructure unit includes multiple triangular pyramid units 11 arranged in an array.

Figure 3:
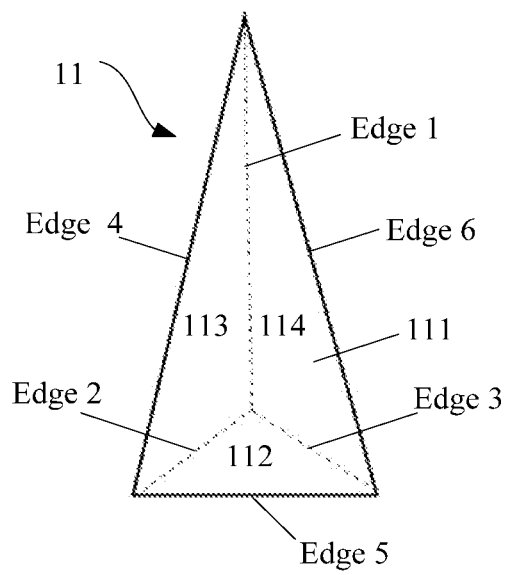
FIG. 3 is a perspective view of a triangular pyramid unit shown in FIG. 1.

FIG. 3 is a perspective view of a triangular pyramid unit 11 shown in FIG. 1. Referring to FIG. 1 to FIG. 3, a single triangular pyramid unit 11 includes six straight edges: edge 1, edge 2, edge 3, edge 4, edge 5, and edge 6. The edge 4, the edge 5, and the edge 6 are connected end to end sequentially to form a triangular first surface 111; the edge 2, the edge 3, and the edge 5 are connected end to end sequentially to form a triangular second surface 112; the edge 1, the edge 2, and the edge 4 are connected end to end sequentially to form a triangular third surface 113; the edge 1, the edge 3, and the edge 6 are connected end to end sequentially to form a triangular fourth surface 114.

Figure 4:
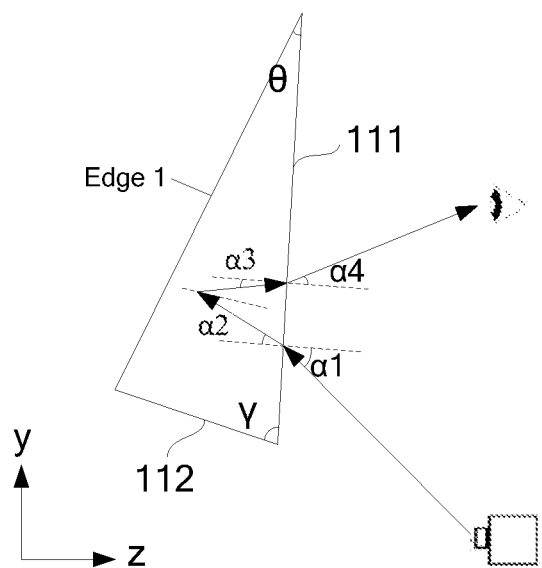
FIG. 4 is a view of the triangular pyramid unit in FIG. 3 in a vertical viewing direction.
Figure 5:
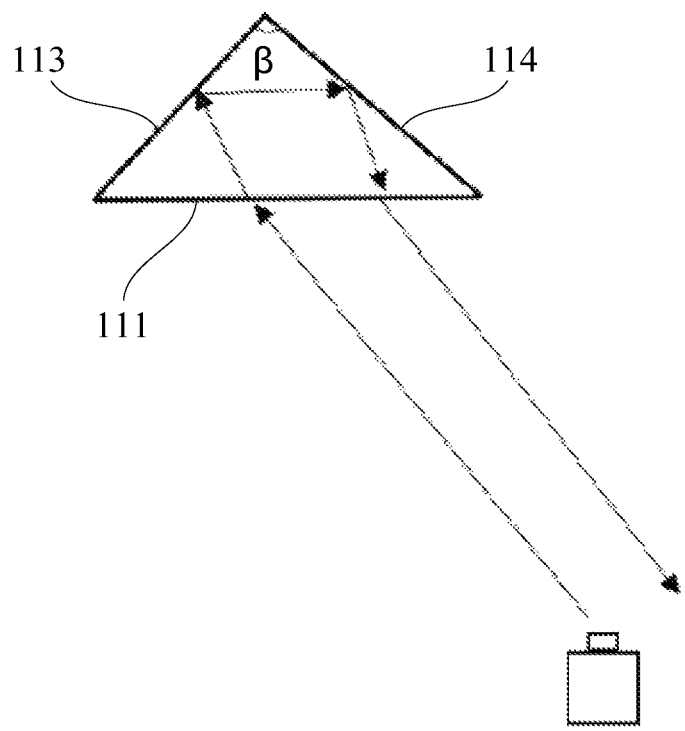
FIG. 5 is a view of the triangular pyramid unit in FIG. 3 in a horizontal viewing direction.

FIG. 4 is a view of the triangular pyramid unit 11 in FIG. 3 in a vertical viewing direction. Referring to FIG. 3 and FIG. 4, an angle θ between the edge 1 and the first surface 111 is a vertex angle. FIG. 5 is a view of the triangular pyramid unit 11 in FIG. 3 in a horizontal viewing direction. Referring to FIG. 3 and FIG. 5, an angle β between the third surface 113 and the fourth surface 114 is a span angle.

Referring to FIG. 1 to FIG. 5, the first surfaces 111 of all triangular pyramid units 11 are located in a same plane, for example, located on a matrix layer 12 with a uniform thickness. The span angles β of all triangular pyramid units 11 face towards a same side. The vertex angles θ of all triangular pyramid units 11 in a row direction face towards a same direction, e.g., facing upwards; all triangular pyramid units 11 in a column direction are aligned one by one from top to bottom, and the vertex angles θ thereof also face towards a same direction. All triangular pyramid units 11 arranged along a first direction/a row direction D1 (e.g., a horizontal direction x shown in FIG. 1) are identical, which indicates that structures and arrangement patterns thereof are identical. That is, the vertex angles θ of the triangular pyramid units 11 arranged along the first direction D1 are the same. The vertex angles θ of the triangular pyramid units 11 arranged along a second direction/a column direction D2 (e.g., a vertical direction y shown in FIG. 1) are different.

In the present disclosure, referring to FIG. 3, FIG. 4, and FIG. 5, after image light transmitted from a projector is incident on the projection screen 10, the image light is refracted by the first surface 111 and then irradiated on the third surface 113 or the fourth surface 114. A part of light reflected by the third surface 113 (a light component in the horizontal direction as shown in FIG. 5) is irradiated to the fourth surface 114, reflected by the fourth surface 114, and transmitted by the first surface 111 to human eyes. Another part of light reflected by the third surface 113 (a light component in the vertical direction as shown in FIG. 4) is irradiated to the first surface 111 and transmitted by the first surface 111 to the human eyes. Similarly, a part of light reflected by the fourth surface 114 (e.g., a light component in the horizontal direction) is irradiated to the third surface 113, reflected by the third surface 113, and transmitted by the first surface 111 to the human eyes; another part of light reflected by the fourth surface 114 (e.g., a light component in the vertical direction) is irradiated to the first surface 111 and transmitted by the first surface 111 to the human eyes. The first surface 111 not only serves as a light incident surface of the projection screen 101, but also serves as a light output surface of the projection screen 10. The image light is finally transmitted by the first surface 111 to the human eyes.

Based on this principle, in the projection screen 10, provided that the vertex angles θ of the multiple triangular pyramid units 11 arranged along the second direction D2 satisfy a preset relationship, the image light transmitted from the projector can be reflected by the triangular pyramid units 11 and then converged in a range centered around the human eyes, to reduce brightness differences at different viewing positions, thereby ensuring good brightness uniformity and high gain of the projection screen. Specifically, In a horizontal direction, when the projector is located at a lower half part of the projection screen 10, assuming that the human eyes are at a middle position of the projection screen 10, the vertex angles θ gradually increase from bottom to top (with FIG. 4 and FIG. 6 as an example), so as to transmit as much image light to the position of the human eyes as possible.

In the horizontal direction, when the projector is located at an upper half part of the projection screen 10, still assuming that the human eyes are at the middle position of the projection screen 10, the vertex angles θ gradually increase from top to bottom (with FIG. 4 as an example), so as to transmit as much image light to the position of the human eyes as possible.

According to an image light transmission path shown in FIG. 4 (it should be understood that the image light transmission path shown in FIG. 4 is not an actual image light transmission path; sizes of incident angles and reflection angles of the image light at various interfaces are not in the relationship shown in FIG. 4; FIG. 4 merely illustrates an angle variation trend of the vertex angles θ in the case of different incident angles and reflection angles), the triangular pyramid unit 11 satisfy the following relational expressions:

$$\alpha 2 - \alpha 3 = 2 \times \theta \qquad \text{relational expression 1-1,}$$

$$\sin \alpha 1 = n \times \sin \alpha 2 \qquad \text{relational expression 1-2, and}$$

$$\sin \alpha 4 = n \times \sin \alpha 3 \qquad \text{relational expression 1-3,}$$

where θ denotes the vertex angle of the triangular pyramid unit 11, α1 denotes an incident angle of the image light when it is transmitted to the first surface 111 during incidence, α2 denotes a refraction angle of the image light after it is refracted by the first surface 111 during incidence, α3 denotes an incident angle of the image light when it is transmitted to the first surface 111 during emergence, α4 denotes an emergent angle of the image light, and n is a refractive index of the triangular pyramid unit 11.

The following relational expression 1 can be derived from the above three relational expressions:

$$\theta = \frac{\arcsin\left(\frac{\sin\alpha 1}{n}\right) - \arcsin\left(\frac{\sin\alpha 4}{n}\right)}{2}. \quad \text{relational expression 1}$$

Figure 6:
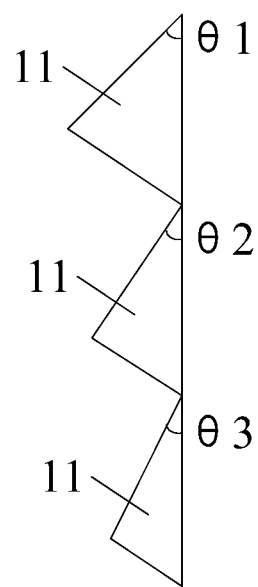
FIG. 6 is a schematic diagram of a partial structure of the projection screen shown in FIG. 2.

In other words, provided that the vertex angles θ of the triangular pyramid units 11 arranged along the second direction D2 satisfy the relational expression 1 (namely, the above predetermined relationship), in the vertical direction y, the incident angles α1 and the emergent angles α4 change continuously between adjacent triangular pyramid units 11, and working angles θ of adjacent triangular pyramid units 11 on the projection screen 10 also change continuously. That is, as shown in FIG. 6, the vertex angles θ1, θ2 and θ3 of three adjacent triangular pyramid units 11 in the vertical direction change continuously according to the relational expression 1.

When the projector is located in the lower half part of the projection screen 10, assuming that the human eyes are at the middle position of the projection screen 10 and light beams emitted by the projector are cone-shaped, the triangular pyramid unit 11 at the lowermost of the projection screen 10 has a minimum incident angle α1 and a maximum emergent angle α4, and the triangular pyramid units 11 located at higher positions of the projection screen 10 have gradually increasing incident angles α1 and gradually decreasing emergent angles α4. The incident angle α1 and the emergent angle α4 vary within a range of 0°-90°, that is:

$$\arcsin\left(\frac{\sin\alpha 1}{n}\right)$$

increases gradually and $$\arcsin\left(\frac{\sin\alpha 4}{n}\right)$$

decreases gradually, so $$\arcsin\left(\frac{\sin\alpha 1}{n}\right) - \arcsin\left(\frac{\sin\alpha 4}{n}\right)$$

increases gradually.

It can be seen that the vertex angles θ gradually increase from bottom to top of the projection screen 10.

When the projector is located in the upper half part of the projection screen 10, assuming that the human eyes are at the middle position of the projection screen 10 and light beams emitted by the projector are cone-shaped, the triangular pyramid unit 11 at the uppermost of the projection screen 10 has a minimum incident angle α1 and a maximum emergent angle α4, and the triangular pyramid units 11 located at lower positions of the projection screen 10 have gradually increasing incident angles α1 and gradually decreasing emergent angles α4. The incident angle α1 and the emergent angle α4 vary within a range of 0°-90°, that is:

$$\arcsin\left(\frac{\sin\alpha 1}{n}\right)$$

decreases gradually and arcsin $$\left(\frac{\sin\alpha 4}{n}\right)$$

increases gradually, so $$\arcsin\left(\frac{\sin\alpha 1}{n}\right) - \arcsin\left(\frac{\sin\alpha 4}{n}\right)$$

decreases gradually.

It can be seen that the vertex angle θ gradually decreases from bottom to top of the projection screen 10.

Figure 7:
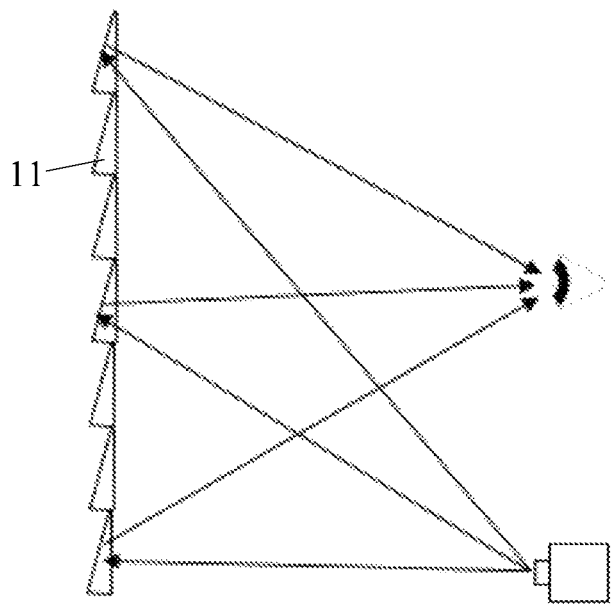
FIG. 7 is a schematic diagram of vertical transmission of image light projected to the projection screen shown in FIG. 1.

It can be learned from the above that, in the vertical direction y of the projection screen 10, by setting different working angles θ at different height positions, all the image light transmitted from the projector to different positions of the projection screen 10 can be converged within the range where the human eyes are located, as shown in FIG. 7.

Figure 9:
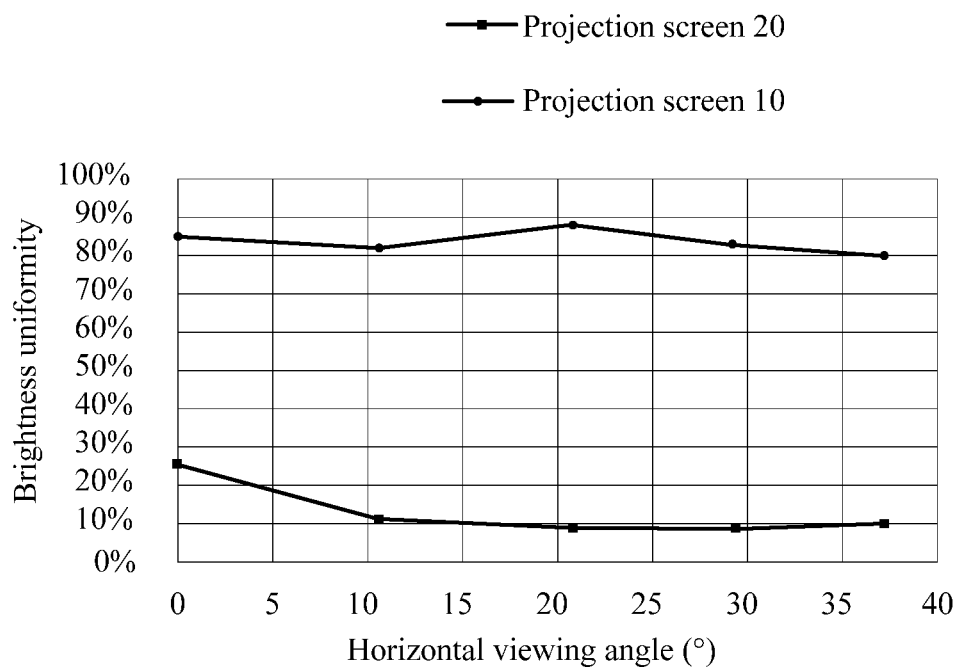
FIG. 9 is a schematic diagram showing correspondences between a horizontal view angle and brightness uniformity of image light when being projected to the projection screen shown in FIG. 1 and to an existing screen.
Figure 16:
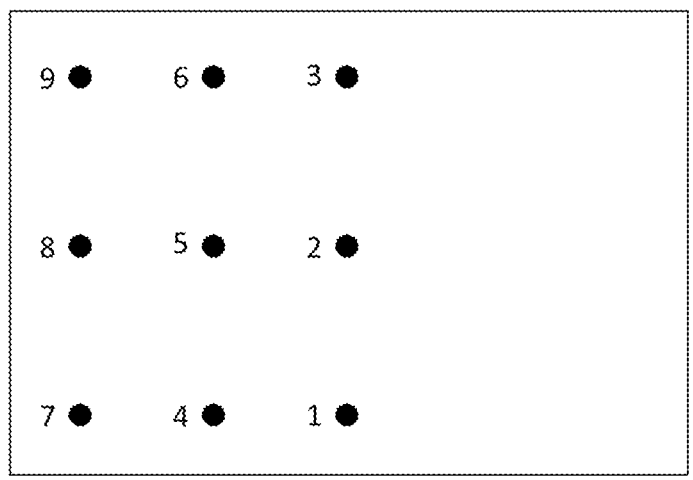
FIG. 16 is a schematic diagram showing the definition of brightness uniformity according to the present disclosure.

In an actual scenario, both the third surface 113 and the fourth surface 114 of the triangular pyramid unit 11 are treated with physical vapor deposition (PVD) to achieve a surface reflectivity of 88%. With this implementation scenario as an example, as a viewer moves away from the central position of the projection screen 10 in the horizontal direction, i.e., as a horizontal viewing angle changes, variations of brightness uniformity of the projection screen 10 in this embodiment and an existing projection screen 20 are as shown in FIG. 9. The brightness uniformity is also known as 9-point uniformity. With reference to FIG. 16, 9 points are uniformly distributed on half of the projection screen 10 (for example, the left half of the screen), the brightness being L (n, n=1, 2 . . . , 9). The brightness uniformity L0 is expressed as a ratio of minimum brightness min L(n) to central luminance L(2), that is, $$L0 = \frac{\min L(n)}{L(2)}.$$

It can be learned from FIG. 9 that, the brightness uniformity of the projection screen 10 is maintained at 80% or above, which is much higher than a brightness uniformity of the projection screen 20 in the related art. In this case, the gain of the projection screen 10 is 4.9, which is much greater than the gain of 1, thus achieving high gain.

Referring to FIG. 4, γ is an angle between the second surface 112 and the first surface 111. A larger value of γ causes a larger area of the third surface 113 and a larger area of the fourth surface 114, and in this case, the triangular pyramid unit 11 has higher reflection efficiency and higher energy utilization for the image light emitted from the projector. In practical application, considering the draftability of the triangular pyramid unit 11, the value of γ ranges from 70° to 90°.

To improve the light reflection efficiency, the third surface 113 and the fourth surface 114 can be coated with a reflective material. The reflective coating can be a mixture of a metal reflective material (such as aluminum or silver) and other additives. The additives include a particular proportion of mixture of a leveling agent, a wetting agent, a defoaming agent and the like that are used to improve a coating effect, or a particular proportion of mixture of anhydrous acetone, anhydrous xylene, anhydrous cyclohexanone, anhydrous butanone, ethyl acetate and anhydrous butyl acetate, and the like. Depending on the actual application scenario, an appropriate diffusion material can also be added to the reflective coating to enhance the diffusion effect. The diffusion material includes, but not limited to, epoxy, acrylic or silicone organic resin particles, or other inorganic scattering materials. The second surface 112 is a non-working surface and can be painted black.

Figure 8:
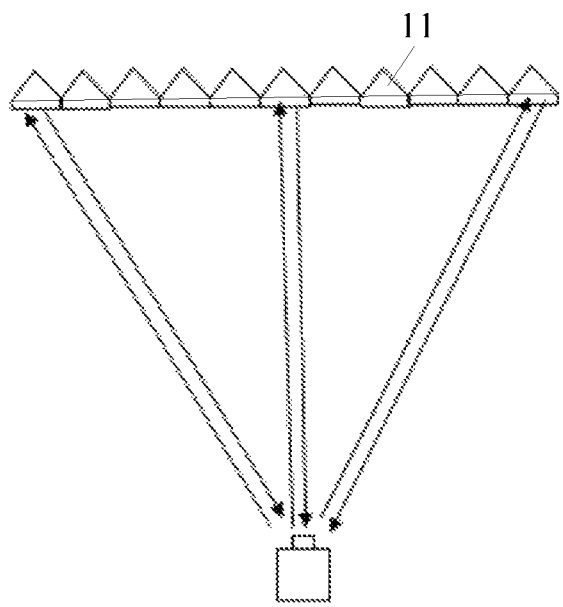
FIG. 8 is a schematic diagram of horizontal transmission of image light projected to the projection screen shown in FIG. 1.

Referring to FIG. 5 again, in the horizontal direction x, the span angle β is an angle between the third surface 113 and the fourth surface 114, and the value of β is in a range of 90°±20°. When β=90°, after the image light transmitted from the projector is incident on the projection screen 10, the image light is reflected by the third surface 113 and the fourth surface 114, to be transmitted to the first surface 111, and then refracted back to the projector in a direction the same as the incident direction. As shown in FIG. 8, at different positions in the horizontal direction, the image light transmitted from the projector to different positions of the projection screen 10 all return back to the projector along the original paths. When β≠90°, the image light transmitted from the projector to different positions of the projection screen 10 cannot return to the projector along the original paths, but becomes a focal line in the horizontal direction of the observing plane. It is assumed that δ=90°−β, where a larger absolute value of δ corresponds to a longer focal line.

Referring to FIG. 2 again, the projection screen 10 can further include a diffusion layer 12, a reflective layer 13, and a protective layer 14, and can include any combination thereof. The triangular pyramid units 11 arranged in an array forms an optical structure layer of the projection screen 10. The optical structure layer can be prepared by heat embossing or UV glue transfer on a transparent substrate 12. The transparent substrate 12 includes, but not limited to, organic materials such as polyethylene terephthalate (PET), polycarbonate (PC), polyvinyl chloride (PVC), polymethyl methacrylate (PMMA), etc. The substrate 12 can be formed by a diffusion layer 12 with a uniform thickness. The thickness of the diffusion layer 12 can be within a range from 100 μm to 1000 μm, and the diffusion layer 12 can be made of epoxy, acrylic or silicone organic resin particles, or other inorganic scattering materials. The optical structure layer is attached and fixed to the diffusion layer 12, and the first surfaces 111 of the triangular pyramid units 11 are attached and fixed to the diffusion layer 12. The reflective layer 13 covers the optical structure layer. The reflective layer 13 can be doped with scattering particles for scattering light, to enhance the light scattering effect. The protective layer 14 covers an outermost side of the projection screen 10. The protective layer 14 can be prepared by using a water and oxygen barrier material, to project the internal structure. The triangular pyramid units in the same row are identical to each other, and the triangular pyramid units in the same column respectively have vertex angles that vary gradually.

The diffusion layer 12, the optical structure layer, the reflective layer 13, and the protective layer 14 can be attached to and fixed to each other together through a glue, to jointly form the projection screen 10 with high gain and good uniformity.

Referring to FIG. 1 again, a region between two adjacent triangular pyramid units 11 that are arranged along the horizontal direction x is a light transmission region 15. In other words, half region of the optical structure layer in an embodiment is provided with triangular pyramid microstructures, and the other half region is vacant. In this way, the projection screen 10 of this embodiment is applicable to scenarios where both a foreground image and background content need to be displayed.

Figure 10:
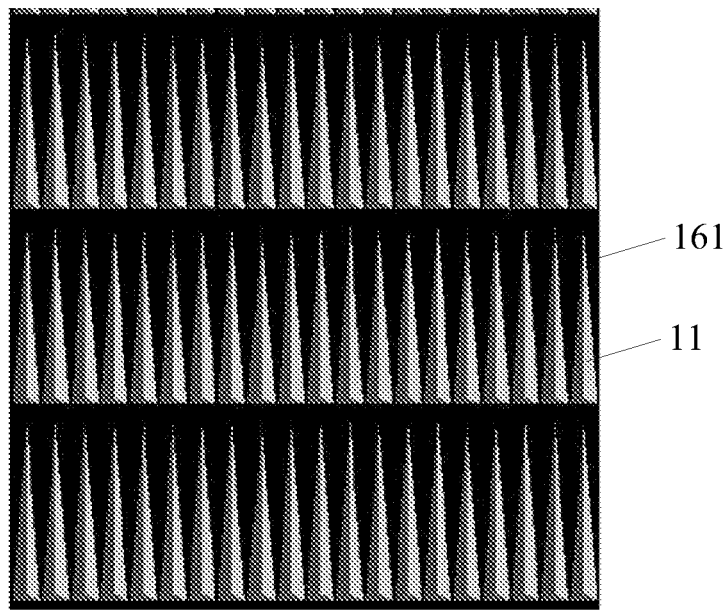
FIG. 10 is a top view of a partial structure of a microstructure layer of a projection screen according to a second embodiment of the present disclosure.

FIG. 10 is a top view of a partial structure of a microstructure layer of a projection screen according to a second embodiment of the present disclosure. The present disclosure adopts the same reference numeral to represent identical elements. Referring to FIG. 10, different from the foregoing embodiment, a black coating layer 161 is provided in a vacant region of the microstructure unit in an embodiment, that is, in a region between two adjacent triangular pyramid units 11 in a same row. The black coating layer 161 is configured to absorb light irradiated thereon. Therefore, light from the back of the projection screen 10 (which can be considered as ambient light) can be absorbed by the black coating layer 161, so that the projection screen 10 provided by the embodiment has high resistance against the ambient light, and is applicable to scenarios where it is unnecessary to see the background.

The projection screen 10 can also be provided with other opaque structures in the region between two adjacent triangular pyramid units 11 in the same row. Light from the back of the projection screen 10 can be shielded by the opaque structure, so that the projection screen 10 of this embodiment has high resistance against ambient light, and is applicable to scenarios where it is unnecessary to see the background.

Figure 11:
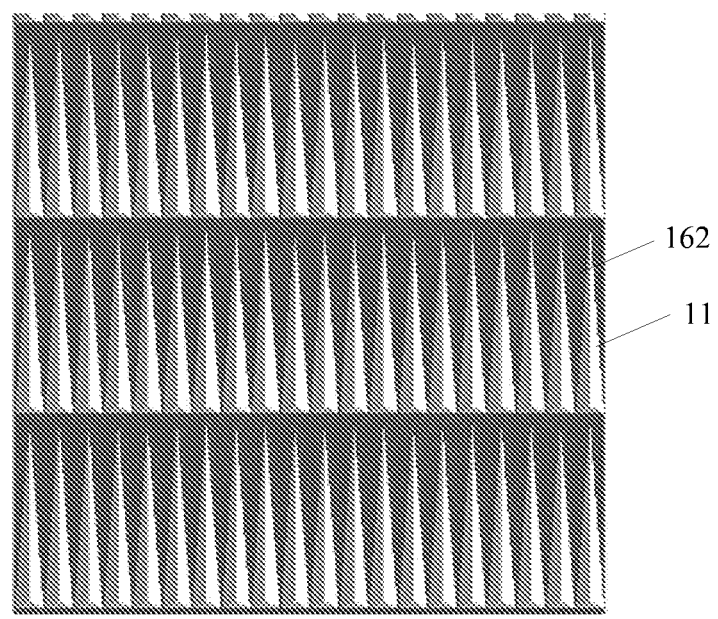
FIG. 11 is a top view of a partial structure of a microstructure layer of a projection screen according to a third embodiment of the present disclosure.

FIG. 11 is a top view of a partial structure of a microstructure layer of a projection screen according to a third embodiment of the present disclosure. As shown in FIG. 11, different from the foregoing embodiment, an optical coating layer 162 is provided between two adjacent triangular pyramid units 11 in the same row. The optical coating layer 162 can include a metal reflective material, a black absorption material, other additives, and a diffusion material, and proportions of the materials of the reflective coating can be adjusted according to actual requirements, to adjust the light transmittance and light reflectivity of the optical coating layer 162. The optical coating layer 162 not only has a light absorbing capability, but also has light reflection and light diffusion capabilities. Therefore, the projection screen 10 of the embodiment not only has high resistance against ambient light to be applicable to scenarios where it is unnecessary to see the background, but also has the light reflection and light diffusion capabilities to improve the intensity of light transmitted to human eyes, thus achieving high gain.

Figure 12:
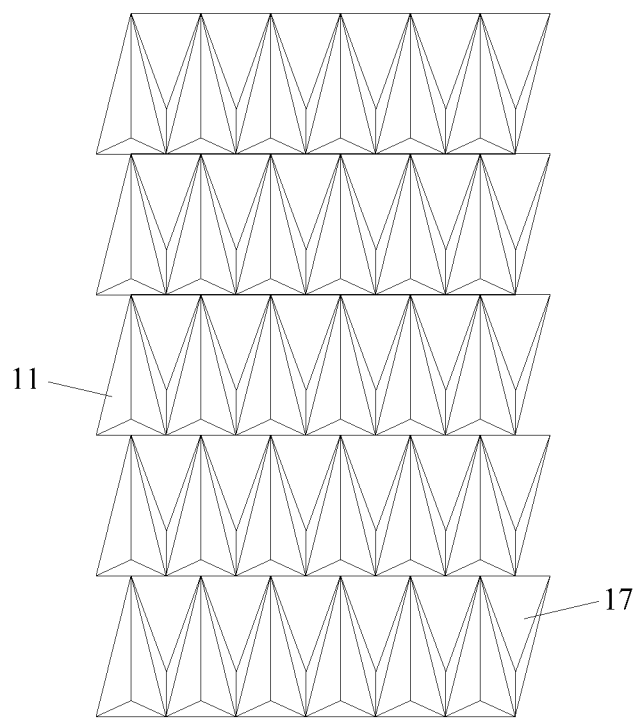
FIG. 12 is a top view of a partial structure of a microstructure layer of a projection screen according to a fourth embodiment of the present disclosure.
Figure 13:
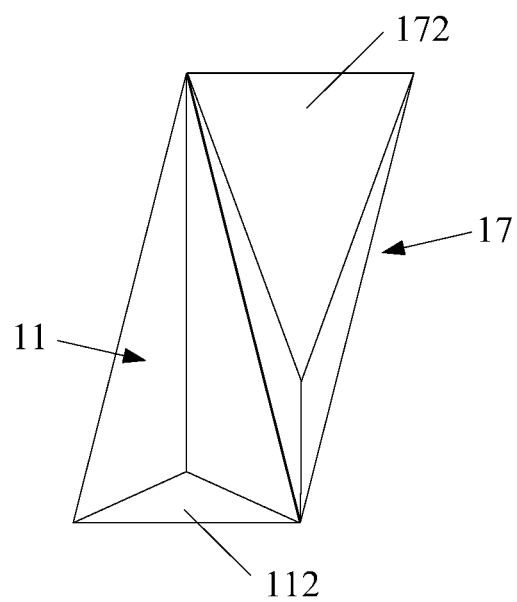
FIG. 13 is a schematic diagram of arrangement of a triangular pyramid unit and an anti-structure prism shown in FIG. 12.

FIG. 12 is a top view of a partial structure of a microstructure layer of a projection screen according to a fourth embodiment of the present disclosure. As shown in FIG. 12, different from the foregoing embodiment shown in FIG. 1, an anti-structure prism 17 is provided between two adjacent triangular pyramid units 11 in the same row. The structure of the anti-structure prism 17 is substantially the same as a structure of the triangular pyramid unit 11. In a direction of view perpendicular to the projection screen 10, with reference to FIG. 13, any one of the triangular pyramid units 11 is centrally symmetrical with its neighboring anti-structure prism 17. The first surface 111 of the triangular pyramid unit 11 and a first surface of its neighboring anti-structure prism 17 face towards the same direction. The difference lies in that, the vertex angles of the triangular pyramid units 11 vary gradually in a direction opposite to a direction in which the vertex angles of the anti-structure prisms 17 gradually. For example, the vertex angles θ of the multiple triangular pyramid units 11 gradually increase from bottom to top along the projection screen 10, while the vertex angles of the plurality of anti-structure prisms 17 gradually increase from top to bottom of the projection screen 10. In this way, the vertex angles of the triangular pyramid units 11 and the vertex angles of the anti-structure prisms 17 face towards the same direction. For example, as shown in FIG. 12, the vertex angles of the triangular pyramid units 11 face upwards, while the vertex angles of the anti-structure prisms 17 face downwards. The second surface 112 of the triangular pyramid unit 11 is in the shape of an obtuse triangle while the second surface 172 of the anti-structure prism 17 is in the shape of an acute triangle. Therefore, after the image light enters the interior of the anti-structure prism 17 through the first surface thereof (i.e., the light incident surface), the image light is reflected by the second surface of the anti-structure prism 17, and then transmitted to the position of the human eyes through the first surface (i.e., the light output surface) of the anti-structure prism 17.

When the first surfaces 111 of the triangular pyramid units 11 face towards the projector, the first surfaces of the anti-structure prisms 17 also face towards the projector. It should be understood that, the first surfaces 111 of all triangular pyramid units 11 are located in a same plane, for example, being located on a right side surface of the matrix layer 12 as shown in FIG. 2; the first surfaces 171 of all anti-structure prisms 17 are also located in the same plane, for example, being located on the right side surface of the matrix layer 12 as shown in FIG. 2. Based on the foregoing arrangement of the triangular pyramid units 11 and the anti-structure prisms 17, the vertex angles of all the anti-structure prisms 17 satisfy the following relationship.

In the horizontal direction, when the projector faces towards the light incident surfaces (i.e., the first surfaces) of the anti-structure prisms 17 and is located at the lower half part of the projection screen 10, assuming that the human eyes are at the middle position of the projection screen 10, the vertex angles of the anti-structure prisms 17 increase gradually from bottom to top, and the vertex angles of the anti-structure prisms 17 from bottom to top also meet the foregoing relational expression 1, so as to transmit as much image light to the position of the human eyes as possible.

In the horizontal direction, when the projector faces towards the light incident surfaces of the anti-structure prisms 17 and is located at the upper half part of the projection screen 10, still assuming that the human eyes are at the middle position of the projection screen 10, the vertex angles of the anti-structure prisms 17 increase gradually from top to bottom, and the vertex angles θ of the anti-structure prisms 17 from top to bottom also meet the foregoing relational expression 1, so as to transmit as much image light to the position of the human eyes as possible.

The arrangement of the triangular pyramid units 11 can ensure good uniformity and high gain on one surface of the projection screen 10. The arrangement of the anti-structure prisms 17 causes the image light transmitted from the projector to be also converged in the range centered around the human eyes after being reflected by the anti-structure prisms 17, thereby ensuring the good uniformity and high gain of the projection screen 10.

Figure 14:
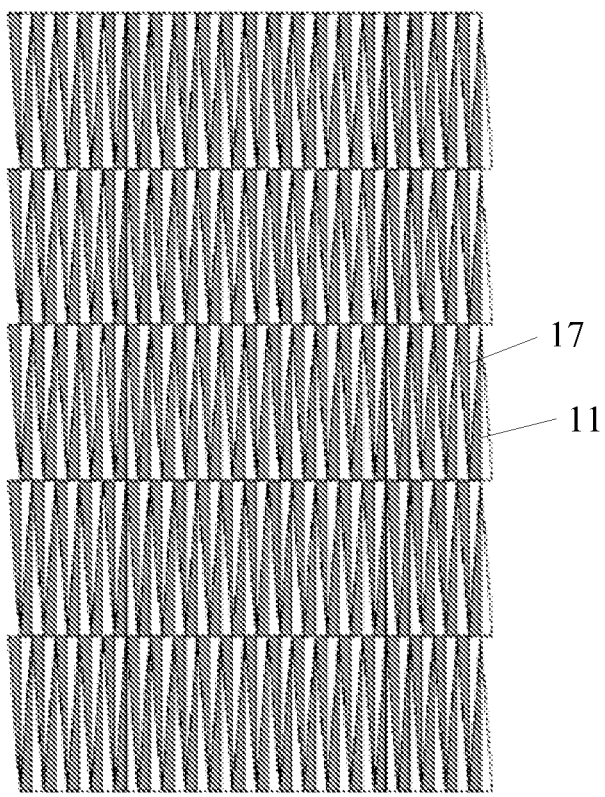
FIG. 14 is a top view of a partial structure of a microstructure layer of a projection screen according to a fifth embodiment of the present disclosure.
Figure 15:
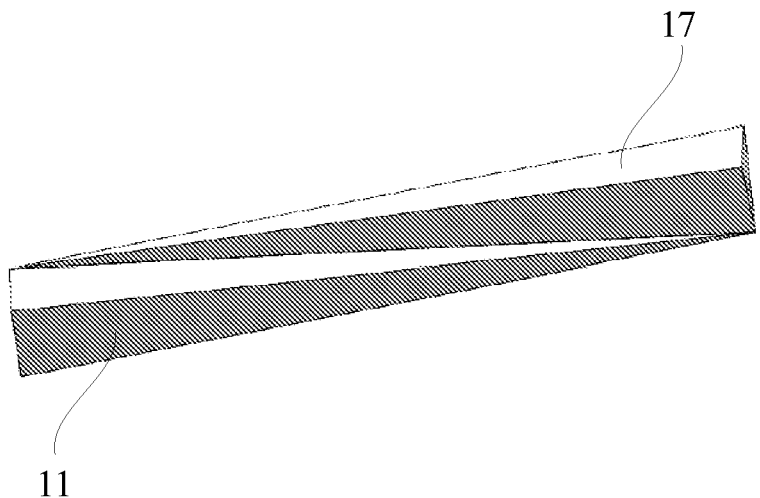
FIG. 15 is a schematic diagram of arrangement of a triangular pyramid unit and an anti-structure prism shown in FIG. 14.

FIG. 14 is a top view of a partial structure of a microstructure layer of a projection screen according to a fifth embodiment of the present disclosure. As shown in FIG. 14, different from the foregoing embodiment shown in FIG. 12, an anti-structure prism 17 is also provided between two adjacent triangular pyramid units 11 in a same row. In a direction of view perpendicular to the projection screen 10, with reference to FIG. 15, although any one of the triangular pyramid units 11 is centrally symmetrical to its neighboring anti-structure prism 17, the first surface 111 of the triangular pyramid unit 11 and the first surface of the anti-structure prism 17 face towards a same direction. In this way, the vertex angles of the triangular pyramid units 11 face towards an opposite direction to a direction in towards which the vertex angles of the anti-structure prisms 17 face. For example, as shown in FIG. 14, the vertex angles of the triangular pyramid units 11 face upwards, while the vertex angles of the anti-structure prisms 17 face downwards.

That is, the first surfaces 111 of the triangular pyramid units 11 and the first surfaces of the anti-structure prism 17 all face towards the projector. In other words, in the same row, the triangular pyramid units 11 and the anti-structure prisms 17 are sequentially arranged in a staggered manner and are centrally symmetrical to each other. It should be understood that, the first surfaces 111 of all the triangular pyramid units 11 are located in the same plane, for example, located on a right side surface of the matrix layer 12 as shown in FIG. 2. The first surfaces of all the anti-structure prisms 17 are also located in a same plane, for example, located on the right side surface of the matrix layer 12 as shown in FIG. 2. Based on the foregoing configuration of the triangular pyramid units 11 and the anti-structure prisms 17, the vertex angles of all anti-structure prisms 17 satisfy the following relationship.

In the horizontal direction, when the projector is located at the lower half part of the projection screen 10, assuming that the human eyes are at the middle position of the projection screen 10, the vertex angles θ of the triangular pyramid units 11 gradually increase from bottom to top (with FIG. 4 as an example), in order to transmit as much image light to the position of the human eyes as possible. As can be seen, when the projector is located at the lower part of the projection screen 10, the image light is converged in a range centered around the human eyes after being reflected by the triangular pyramid units 11, to reduce brightness differences at different viewing positions, thereby ensuring good uniformity and high gain of the projection screen 10.

In the horizontal direction, when the projector is located at the upper half part of the projection screen 10, still assuming that the human eyes are at the middle position of the projection screen 10, the vertex angles of the anti-structure prisms 17 increase gradually from top to bottom, and the vertex angles of the anti-structure prisms 17 from top to bottom also satisfy the foregoing relational expression 1, so as to transmit as much image light to the position of the human eyes as possible. As can be seen, when the projector is located above the projection screen 10, the image light is converged in a range centered around the human eyes after being reflected by the anti-structure prisms 17, to reduce brightness differences at different viewing positions, thereby also ensuring good uniformity and high gain of the projection screen 10.

In the horizontal direction, when the projector is located at the lower half part of the projection screen 10, assuming that the human eyes are at the middle position of the projection screen 10, the vertex angles θ of the triangular pyramid units 11 gradually increase from bottom to top (with FIG. 4 as an example), in order to transmit as much image light to the position of the human eyes as possible. As can be seen, when the projector is located below the projection screen 10, the image light is converged in a range centered around the human eyes after being reflected by the triangular pyramid units 11, to reduce brightness differences at different viewing positions, thereby ensuring good uniformity and high gain of the projection screen 10.

In conclusion, whether the projector is located above or below the projection screen 10, the projection screen 10 can have good uniformity and high gain.

It should be noted that, the above merely illustrates embodiments of the present disclosure, which do not limit the scope of the patent of the present disclosure. Any equivalent structure or equivalent process change made based on the description and drawings of the present disclosure, such as combination of technical features between different embodiments, or direct or indirect application thereof in other related technical fields, should still fall in the protection scope of the patent of the present disclosure.

It should be additionally noted that, the terms such as "first" and "second" in the present disclosure are used only for the purpose of description and cannot be understood as indicating or implying relative importance or implicitly indicating the number of technical features denoted. Therefore, features defined by "first" and "second" can explicitly or implicitly include at least one of the features. The term "a plurality of/multiple" indicates at least two, for example, two or three, unless otherwise clearly and specifically limited. All the directional indications (such as upper, lower, left, right, front, back, etc.) in the embodiments of the present disclosure are merely used to explain a relative position relationship, motion situations, and the like of the components in a specific gesture (as shown in the figures). If the specific gesture changes, the directivity indication also changes accordingly.

The invention claimed is:

1. A projection screen, comprising:
a microstructure layer, wherein the microstructure layer comprises a transparent substrate and a microstructure unit formed on a surface of the transparent substrate; wherein the microstructure unit comprises triangular pyramid units arranged in an array, wherein at least two of the triangular pyramid units that are arranged in a same row are identical to each other, wherein at least two triangular pyramid units of the triangular pyramid units that are arranged in a same column respectively have vertex angles that vary gradually, and each of the vertex angles forms between the surface of the transparent substrate and an edge of one of the triangular pyramid units that has the vertex angle.

2. The projection screen according to claim 1, wherein the vertex angles of the at least two triangular pyramid units arranged along a column direction satisfy:

$$\theta = \frac{\arcsin\left(\frac{\sin\alpha 1}{n}\right) - \arcsin\left(\frac{\sin\alpha 4}{n}\right)}{2},$$

wherein θ denotes a vertex angle of one triangular pyramid unit of the at least two triangular pyramid units, α1 denotes an incident angle of image light, α4 denotes an emergent angle of the image light, and n denotes a refractive index of the one triangular pyramid unit.

3. The projection screen according to claim 1, wherein a region between two adjacent triangular pyramid units of the triangular pyramid units that are arranged along a row direction is a light transmission region.

4. The projection screen according to claim 1, wherein an opaque structure is disposed between two adjacent triangular pyramid units of the triangular pyramid units that are arranged along a row direction.

5. The projection screen according to claim 1, wherein an optical coating layer is disposed between two adjacent triangular pyramid units of the triangular pyramid units that are arranged along a row direction, wherein the optical coating layer comprises at least two of a reflective material, a light-absorbing material, or a light diffusion material.

6. The projection screen according to claim 1, wherein one of anti-structure prisms is disposed between two adjacent triangular pyramid units of the triangular pyramid units that are arranged along a row direction; wherein each of the triangular pyramid units is centrally symmetrical with one anti-structure prism of the anti-structure prisms that is adjacent to the triangular pyramid unit, a light output surface of the triangular pyramid unit and a light output surface of the one neighboring anti-structure prism face towards a same direction, and vertex angles of at least two of the anti-structure prisms arranged along a direction opposite to a column direction vary gradually.

7. The projection screen according to claim 1, wherein one of anti-structure prisms is disposed between two adjacent triangular pyramid units of the triangular pyramid units that are arranged along a row direction, and the anti-structure prisms have a same structure as the triangular pyramid units, wherein each of the triangular pyramid units is centrally symmetrical with one anti-structure prism of the anti-structure prisms that is adjacent to the triangular pyramid unit, and a light output surface of the triangular pyramid unit and a light output surface of the one anti-structure prism face towards a same direction.

8. The projection screen according to claim 1, wherein an angle between two surfaces that intersect each other to form the edge is within a value range of 90°±20°.

9. The projection screen according to claim 1, further comprising:
at least two of a diffusion layer, a reflective layer, or a protective layer, wherein the microstructure unit is disposed on the diffusion layer, and a light output surface of one of the triangular pyramid units is attached to and fixed to the diffusion layer; and the reflective layer covers the microstructure unit, and the protective layer covers an outermost side of the projection screen.

10. The projection screen according to claim 9, wherein the reflective layer is doped with scattering particles for scattering light.

11. The projection screen according to claim 9, wherein the diffusion layer is a layer structure with a uniform thickness, and the diffusion layer is the transparent substrate of the projection screen.

12. The projection screen according to claim 11, wherein the thickness of the diffusion layer ranges from 100 μm to 1000 μm.

13. The projection screen according to claim 1, the vertex angles gradually increase from bottom to top.

14. The projection screen according to claim 1, the vertex angles gradually increase from top to bottom.

* * * * *